United States Patent [19]

Husain et al.

[11] Patent Number: 5,082,424
[45] Date of Patent: Jan. 21, 1992

[54] CONNECTION SYSTEM FOR AIRCRAFT PROPELLER BLADES

[75] Inventors: Sifarat S. Husain; Gerard P. Kroger, both of Cincinnati; Robert P. Czachor, Blue Ash, all of Ohio

[73] Assignee: General Electric Company, Cincinnati, Ohio

[21] Appl. No.: 361,151

[22] Filed: Jun. 5, 1989

[51] Int. Cl.⁵ .............................................. B64C 11/00
[52] U.S. Cl. ............................ 416/158; 416/214 A; 416/244 A; 403/291
[58] Field of Search ............... 416/127, 128, 129, 147, 416/148, 155, 156, 158, 159, 160, 157 B, 93 R, 94, 120, 140, 146 A, 154, 244 A, 214 R, 214 A, 215, 135; 244/53 R, 62, 65; 60/39.162, 226.1, 268; 415/135; 403/291

[56] References Cited

U.S. PATENT DOCUMENTS

| | | | |
|---|---|---|---|
| 2,410,804 | 11/1946 | Baumann | 416/126 |
| 3,764,228 | 10/1973 | Shook | 416/214 |
| 4,815,273 | 3/1989 | Rudolph et al. | 60/39.161 |
| 4,826,403 | 5/1989 | Catlow | 415/134 |
| 4,863,352 | 9/1989 | Hauser et al. | 416/204 R |

FOREIGN PATENT DOCUMENTS

| | | | |
|---|---|---|---|
| 2174762 | 11/1986 | United Kingdom | 416/157 B |
| 2199378 | 7/1988 | United Kingdom | 416/160 |

Primary Examiner—Edward K. Look
Assistant Examiner—Hoang Nguyen
Attorney, Agent, or Firm—Jerome C. Squillaro; John R. Rafter

[57] ABSTRACT

The invention relates to a connection system for connecting a ring which carries aircraft propeller blades to a turbine which the ring surrounds. Brackets extend between the ring and the turbine and accommodate thermal expansion of the turbine without significant deformation.

14 Claims, 7 Drawing Sheets

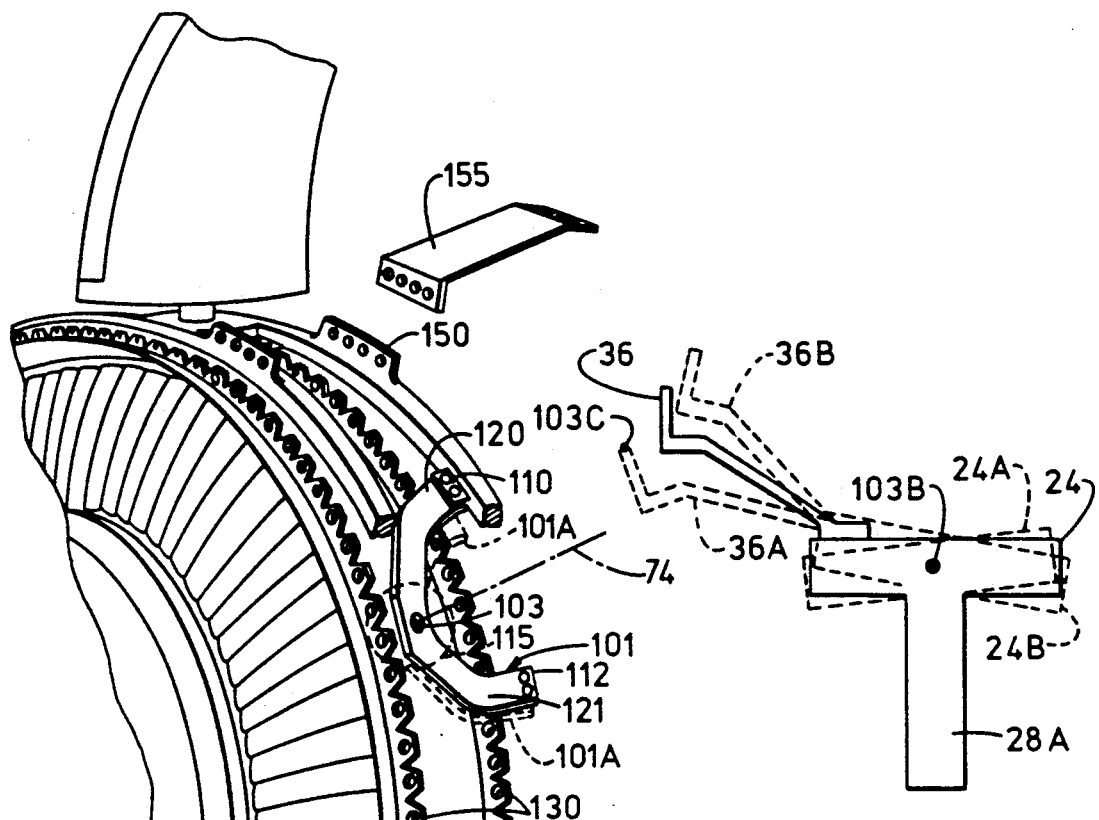
FIG. 7
FIG. 9
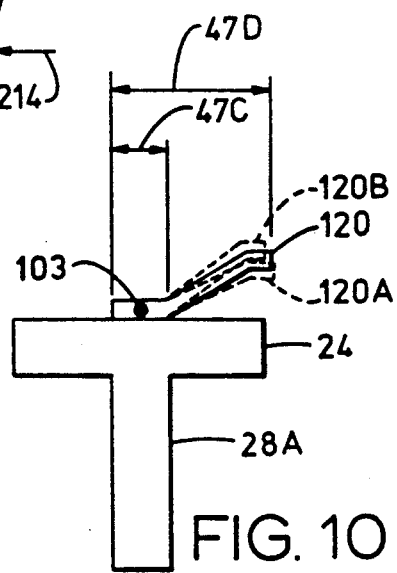
FIG. 10

CONNECTION SYSTEM FOR AIRCRAFT PROPELLER BLADES

The invention relates to the mounting of propeller blades in aircraft engines and, more specifically, to a mounting system in which the propeller blades are mounted to a ring which is, in turn, mounted to a turbine.

BACKGROUND OF THE INVENTION

FIG. 1 illustrates an aircraft engine 3 of the unducted fan type, in which the invention can be used. Region 5 is shown in FIG. 2, wherein counterrotating turbines 9 (hatched) and 12 (plain) are driven by a hot gas stream 14 provided by a core engine (not shown). The turbines 9 and 12, in turn, drive counterrotating fan blades 15 and 18 shown in FIGS. 1 and 2. (The term "counterrotating" means that turbines 9 and 12, as well as blades 15 and 18 to which they are attached, rotate in opposite directions, as shown by arrows 25 and 27 in FIG. 1.)

A view of sub-region 6B in FIG. 2 is shown in FIG. 3, and in more detailed form in FIG. 4. The turbine blades which are located, but not shown, in sub-region 6B in FIG. 2 are shown schematically in FIG. 3 as blades 28 and in detail in FIG. 4. The blades 28 extend between a casing 24 and an inner barrel 41 in FIGS. 3 and 4. The blades extract energy from the gas stream 14 in FIG. 2, and also act as a stiff connecting web between the casing 24 and the barrel 41.

The fan blades 15 in FIG. 3 are supported by a structure which is shown as a ring 22 in FIG. 4, and which is fastened to the casing 24 by brackets 36. During operation, the centrifugal load of the fan blades 15 is carried by the ring 22 as a hoop stress. The brackets 36 transmit the thrust load generated by the fan blades 15 to the casing 24. Other structures, not concerned with the present invention, carry the thrust load to the aircraft in FIG. 1.

One type of bracket is described in the U.S. patent application entitled "Flexible Connector for Use in Aircraft," by Wakeman et al., which was filed on Dec. 19, 1988, having Ser. No. 286,101. This application is hereby incorporated by reference.

The actual ring structure used is not the circular ring 22 shown in FIG. 4, but is a polygonal ring 22P shown in FIG. 5. The polygonal ring 22P includes two types of sections: one type is a blade support section 22B, or "hub," also shown in FIG. 5A, which includes thrust bearings 22D which transmit the centrifugal load imposed by the fan blade 15 to the ring 22P. The thrust bearings 22D allow pitch change of the blade to occur, as indicated by arrow 23.

The other type of ring section is a connector section 22A which connects neighboring hubs 22B. The connector includes rails 29 which are in tension because of the centrifugal load of the blades 15.

One type of polygonal ring is described in the U.S. patent application entitled "Blade Carrying Means", filed by Hauser, Strock, Morris and Wakeman on Nov. 2, 1984, and having Ser. No. 667,663 now U.S. Pat. No. 4,863,352. This application is hereby incorporated by reference.

The polygonal ring also carries a cowling 40 in FIGS. 1 and 2. One type of rotating cowling is described in the U.S. patent application entitled "Rotating Cowling," filed by Hermans and Wakeman on Apr. 11, 1989, having Ser. No. 07/336,375. This application is hereby incorporated by reference.

One arrangement of the turbine/polygonal ring/fan blade/cowling system is shown in FIG. 6. Several features of this system will now be discussed. One, the temperature of the turbine casing 24 can range between ambient temperature when the engine is not running, and a temperature of 1,000 degrees F. during operation. The latter, higher temperature, results from contact with the hot gas stream 14 in FIG. 2 passing through the turbine. This wide swing in temperature causes the circumference of the casing to change in dimension. This dimension change causes the legs 42 in FIG. 5 of the brackets 36 to separate: the legs move to phantom positions 42P: distance 47 has increased to distance 47P. This change in distance causes strain in the bracket 36 at the base region 48.

A second feature of the system is that the brackets extend axially beyond the rails 29 of the polygonal ring, as indicated by distance 50 in FIGS. 5 and 6. This extension beyond rails 29 causes the forging envelope of the polygonal ring to be large. The forging envelope 22E in FIG. 14 (envelope is shown hatched) for the polygonal ring 22P has an axial length L. The forging envelope refers to the rough casting 55 in FIG. 8 which is the precursor of the final forged bracket 36. The envelope 55 is generally larger than the final bracket 36, because the envelope 55 is shaped and trimmed during the forging process.

It is desirable to reduce the size of both forging envelopes.

A third feature of the system is that the cowling 40 is fastened to the ring by other, cowling brackets 57 shown in FIG. 6. The centrifugal load of the fan blades 15 in FIG. 4 stretches the polygonal ring 22P in FIG. 5, thus increasing the diameter of the ring. This diameter increase places added stress upon the cowling, through the cowling brackets 57, because the cowling is subject to no similar diameter increase because of centrifugal load. An example will illustrate the magnitude of the centrifugal forces involved.

It is assumed that the propeller diameter, dimension 60 in FIG. 3, is 12 feet. It is assumed that each fan blade can be treated as a point mass 64 weighing 54 pounds and located on the circumference of a circle 67 which is six feet in diameter. It is also assumed that the speed of rotation is 1200 rpm, or 20 revolutions per second, which corresponds to (2)(pi)(20) radians per second, i.e., about 126 radians per second.

Centrifugal acceleration is equal to $w^2r$, wherein w is angular velocity (radians per second) and r is radius. In this example, the acceleration is about 47,374 feet per second$^2$:

$$47,374 = [126/\text{sec}]^2 \times 3 \text{ feet}$$

Dividing this number by the acceleration due to gravity, 32.2 feet per second$^2$, gives a quotient of about 1471. The quotient is the g field experienced by the point masses.

Stated another way, each point mass 64 (representing the weight of each blade), which originally weighed 54 pounds, now weighs about 80,000 pounds under centrifugal force ($1471 \times 54 = 79,434$). This centrifugal force causes the ring diameter to increase, as well as to assume a slightly polygonal shape, with the blades 15 located at the polygon's vertices. The diameter increase tends to bulge the cowling outward.

A fourth feature of the system concerns a result caused by the type of mounting by which the ring 22P in FIG. 5 is fastened to the casing 24 in FIG. 4. The particular view of the turbine stage shown in FIG. 4 indicates that all turbine blades are identical in shape. However, such is not the case. The blades, such as blades 28A in FIG. 4, which are directly radially inward of the propeller blades, are larger in cross section, as indicated by blade 28A in FIG. 4A, than are the other blades 28. The blades 28A of larger cross-section carry much of the load which the propeller blades 15 apply to the turbine, and, in so doing, act as struts.

It has been found that high oscillatory stresses can exist in these struts during operation. It is possible that these stresses may have been caused by the offset 71 in FIG. 6 between the mounting point 73 of the bracket 36 and the axis 74 of the strut.

OBJECTS OF THE INVENTION

It is an object of the invention to provide an improved connection system between a ring, which carries aircraft propeller blades, and a turbine which the ring surrounds.

It is a further object to provide an improved connection system between a ring, which carries aircraft propeller blades, and a cowling which surrounds the ring and defines a flowpath external to the ring.

SUMMARY OF THE INVENTION

In one form of the invention, several brackets extend between a ring and a turbine which the ring surrounds. The ring carries fan blades. Each bracket connects to a single point on the turbine, but to a pair of points on the ring. Accordingly, thermal expansion of the turbine causes an increase in turbine circumference, which causes radial motion of the single points, and increased separation between neighboring single points, but no significant deformation of each bracket.

In another form of the invention, a cowl, which defines a flowpath, surrounds, and is attached to, the ring at "cowl points." The cowl points are located between, and not at, the mounting points (i.e., "fan mounts") for the fan blades. The centrifugal force of the fan blades causes the fan mounts to move radially outward. However, because the cowl points are located between the fan mounts, their radial motion is reduced or eliminated.

BRIEF DESCRIPTION OF THE DRAWING

FIG. 7 illustrates one form of the invention.

FIGS. 9 and 10 illustrate how blade/strut 28A and casing 24 can behave as a T-shaped support for respective brackets 36 and 120.

DETAILED DESCRIPTION OF THE INVENTION

Figure 4:
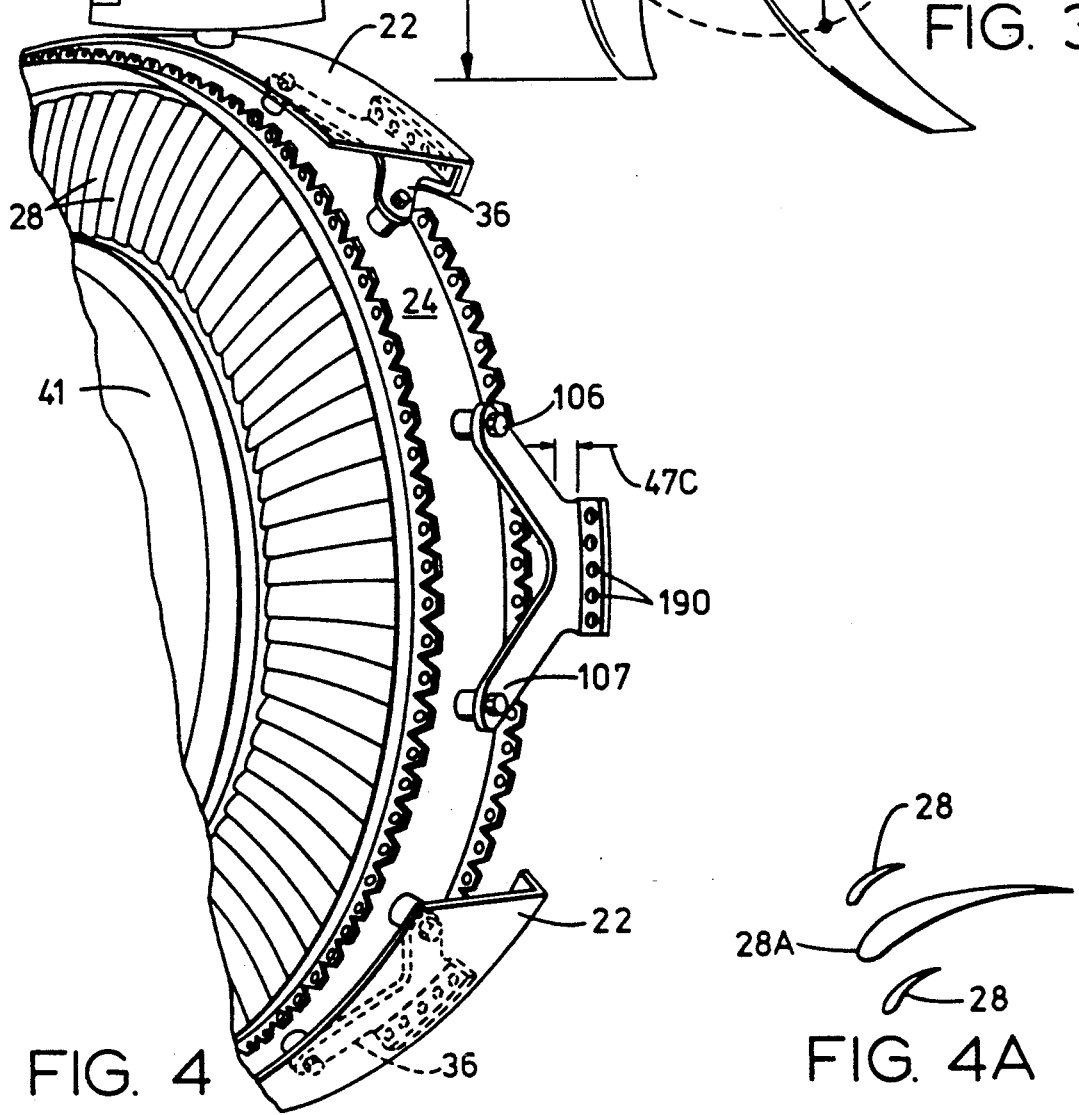
FIG. 4 is a more detailed view of FIG. 3.
Figure 4A:
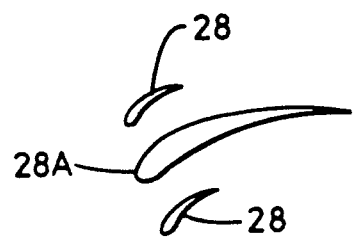
FIG. 4A illustrates in cross section two different types of turbine blades, namely, blades 28 and 28A, of FIG. 4.
Figure 13:
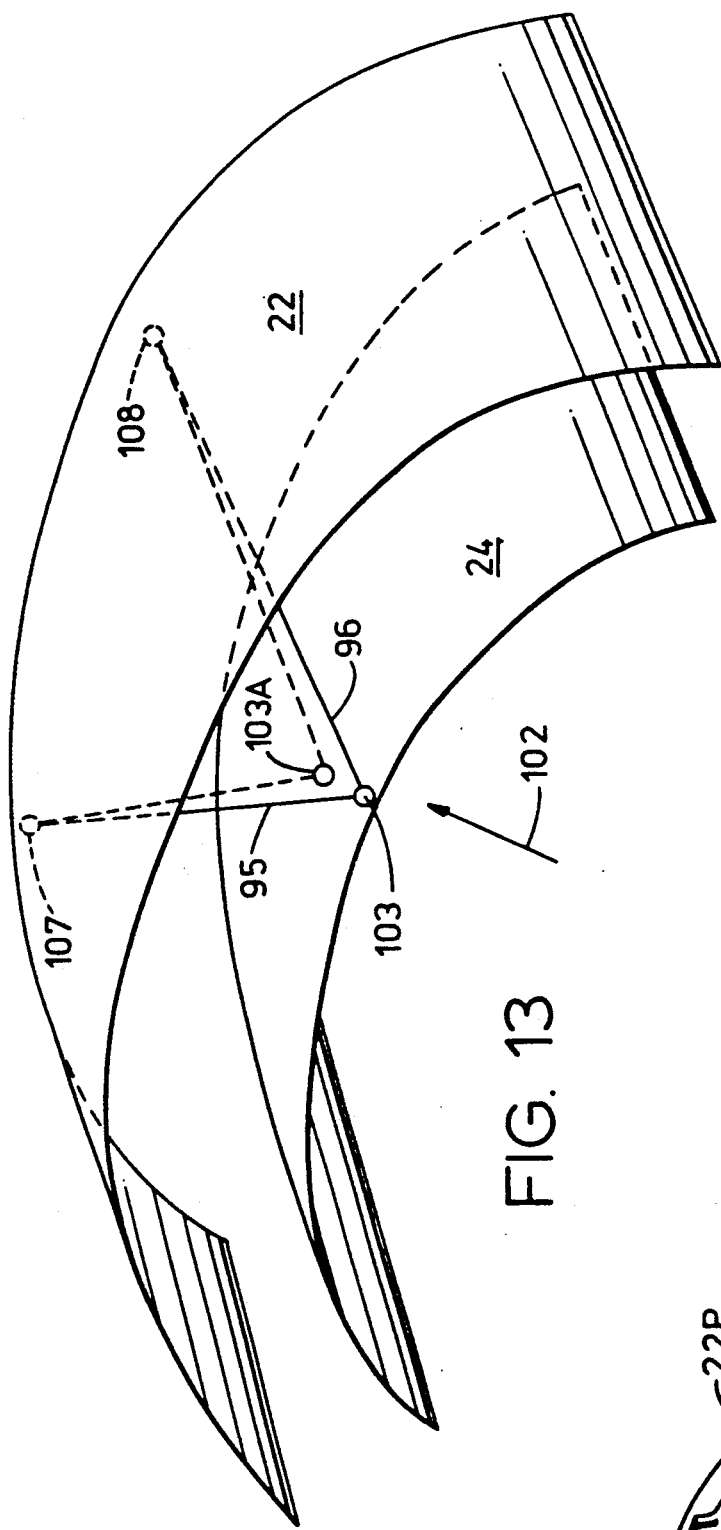
FIG. 13 is a simplified view of one form of the invention.

A simplified form of the invention is shown in FIG. 13, wherein the ring 22 and the casing 24 of FIG. 4 are schematically shown. The simplified invention includes two links 95 and 96 which are fastened to a common anchor point 103 on the casing 24. The links are also fastened to the ring 22 at anchor points 107 and 108. When the casing expands, point 103 moves radially outward, in the direction of arrow 102. Links 95 and 96 do not bend as do prior art legs 42 in FIG. 5. The triangle formed by points 103, 107, and 108 retains its size and shape.

Another form of the invention is shown in FIG. 7, wherein V-shaped brackets 101 connect a polygonal ring to the casing 24 of the turbine. However, unlike the brackets of FIG. 4, which are fastened to the casing 24 at two points 106 and 107, the brackets in FIG. 7 are each fastened at a single point 103. The single point attachment to the casing eliminates the deformation of the brackets described in connection with brackets 36 in FIG. 4: legs 120 and 121 in FIG. 7 do not splay apart when thermal expansion of the casing 24 occurs: instead, the attachment point 103 moves radially outward.

The location of the attachment point 103 in FIG. 7 is significant. Each attachment point 103 is (1) located on the casing surface, (2) located under a hub region 22B in FIGS. 7 and 11 of the ring and, (3) is approximately coincident with the axis 74 in FIG. 6 of one of the struts 28A. Since the brackets 101 are somewhat flexible, each can rotate about point 103. Positioning the attachment point 103 as just described allows the casing 24 to better resist deformation under loads applied by the polygonal ring 22P. An example will illustrate this point.

If the large strut 28A and casing 24 are viewed as having a T shape in cross-section, as in FIGS. 9 and 10, then it is clear that the T can better resist the forces applied by the vibrational flexing of brackets 36 or 120 when the bracket is attached at the center of cross bar 24 of the T, as in FIG. 10, than if attached to an end of the cross bar, as in FIG. 9. If attached to an end of the cross bar, flexing into phantom positions 36A and 36B tends to induce deformation of the cross bar to phantom positions 24A and 24B. However, the attachment of FIG. 10 reduces or eliminates such flexing.

Moreover, the effective center of rotation of the bracket 120 (together with the section of the polygonal ring to which it is mounted, not shown in FIG. 10) lies on the surface of the casing 24, at point 103, near the center (or axis) of the strut 28A. However, the effective center in the situation of FIG. 9 will be the center about which point 103C rotates. This latter center will, in general, be different, and will not be on the surface of casing 24. The latter center may be point 103B in FIG. 9, which lies below the surface.

Figure 8:
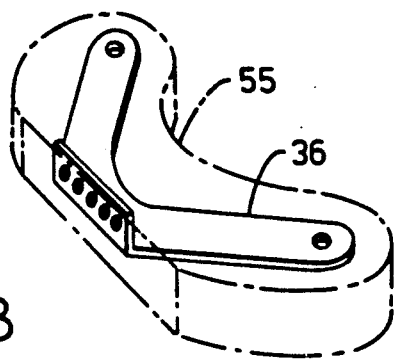
FIG. 8 illustrates a forging envelope for bracket 36 of FIG. 5.

The brackets 101 in FIG. 7 are sized such that they can fit within the axial edges 125 of the ring 22 in FIG. 7. That is, all parts of the brackets lie radially inward of the ring, and no part of a bracket lies axially outside an axial 125 edge of the ring. (As to the meaning of "axially outside," object 130 lies axially outside an axial edge 125 of the polygonal ring.) Such sizing allows a smaller forging envelope to be used for brackets 101, as compared with the envelope 55 required for the prior art brackets 36 of FIG. 8. In addition, the forging envelope of the polygonal ring can be smaller than that in the prior art.

Figure 14:
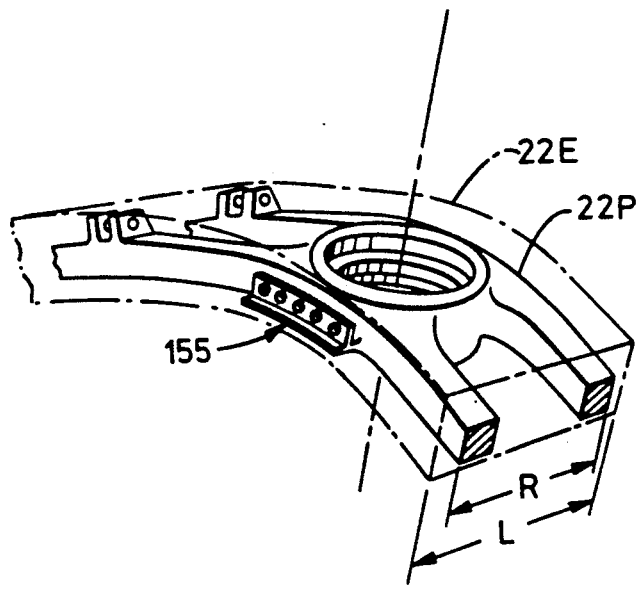
FIG. 14 is a view of the prior art polygonal ring in FIG. 5, taken along arrows 14—14.
Figure 15:
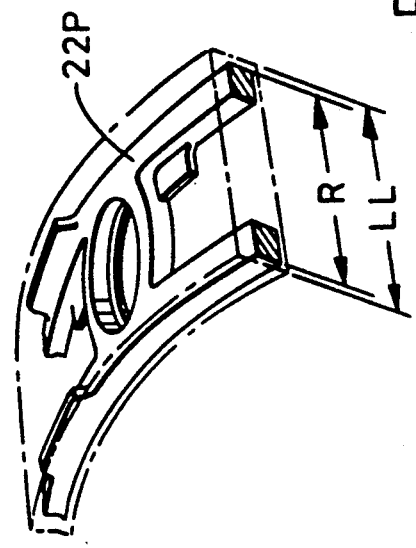
FIG. 15 is a view of the polygonal ring of FIG. 7, taken along arrows 15—15.

The forging envelope of the prior art has an axial length L in FIG. 14. In the present invention, the envelope has an axial length LL in FIG. 15. The new axial length LL is smaller because the new envelope need not contain external brackets 155 in FIGS. 14 and 5: the invention's brackets 101 in FIG. 7 are located axially inside the polygonal ring. That is, for a given width R in FIGS. 14 and 15, the forging envelope of FIG. 15 (for use in the invention) can have a smaller axial length than that in FIG. 14 (the prior art.)

Figure 1:
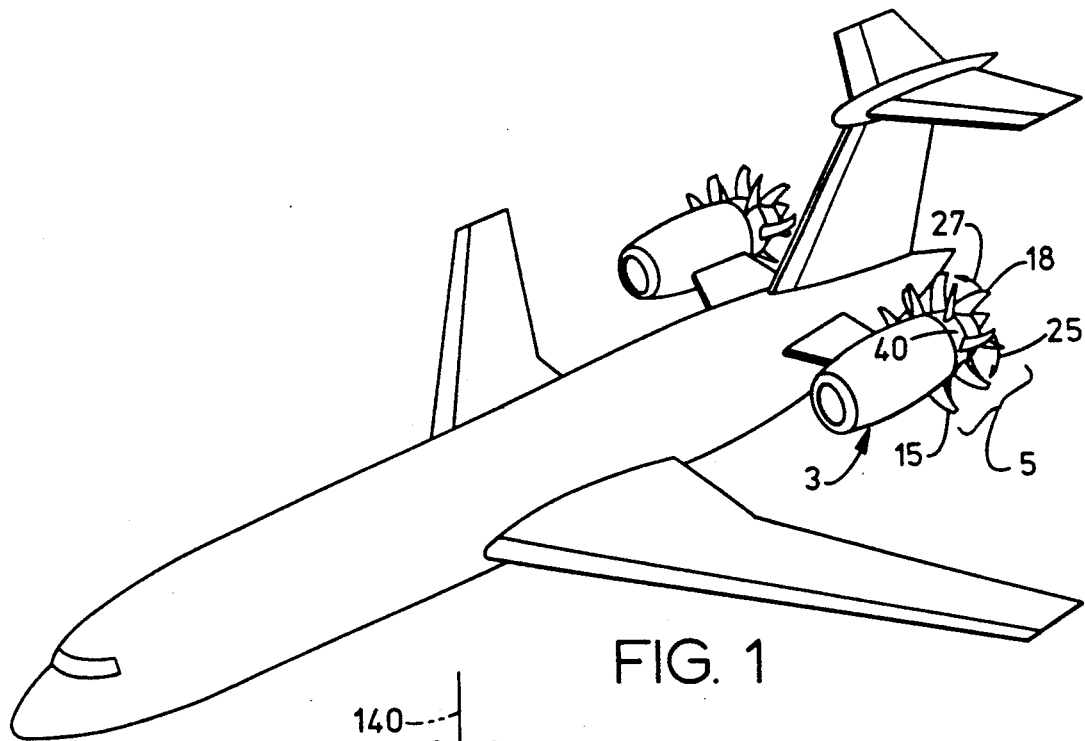
FIG. 1 illustrates an aircraft powered by engines which can use the invention.
Figure 2:
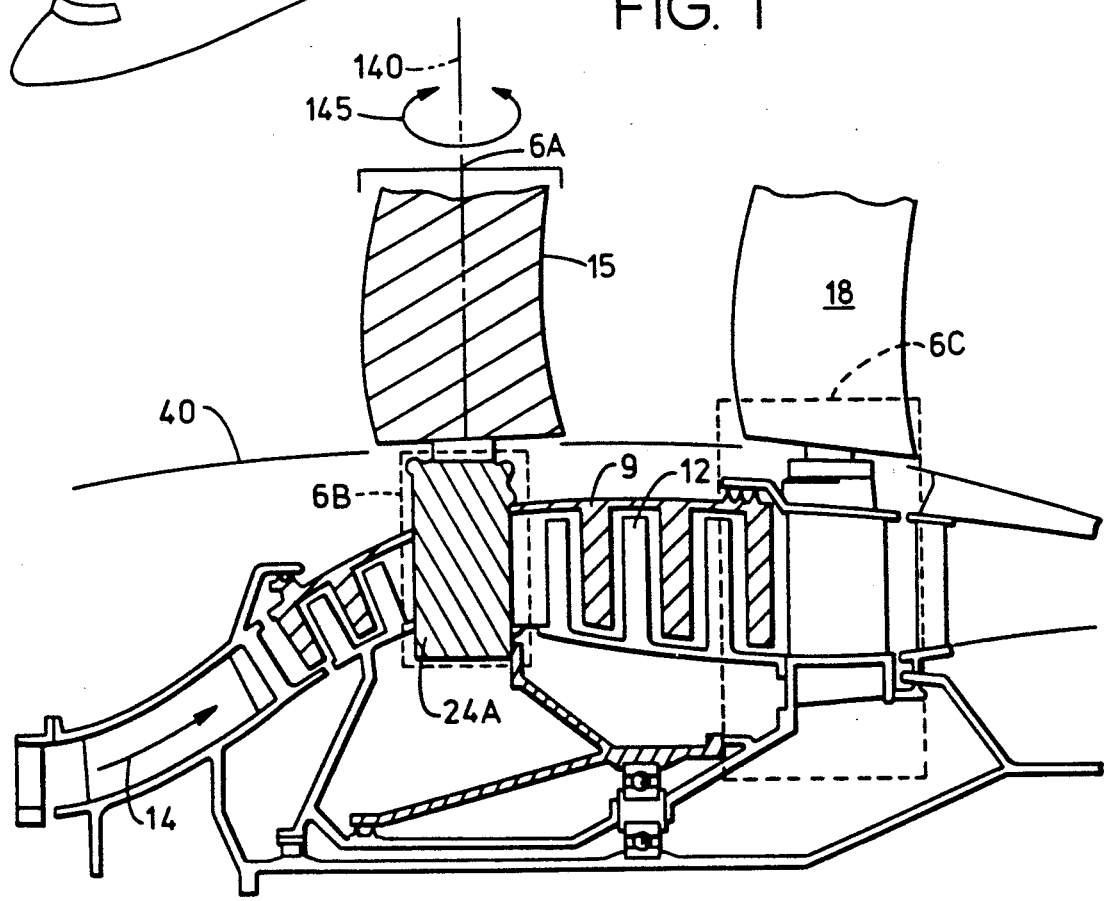
FIG. 2 is a cross-sectional schematic view of region 5 in FIG. 1.
Figure 3:
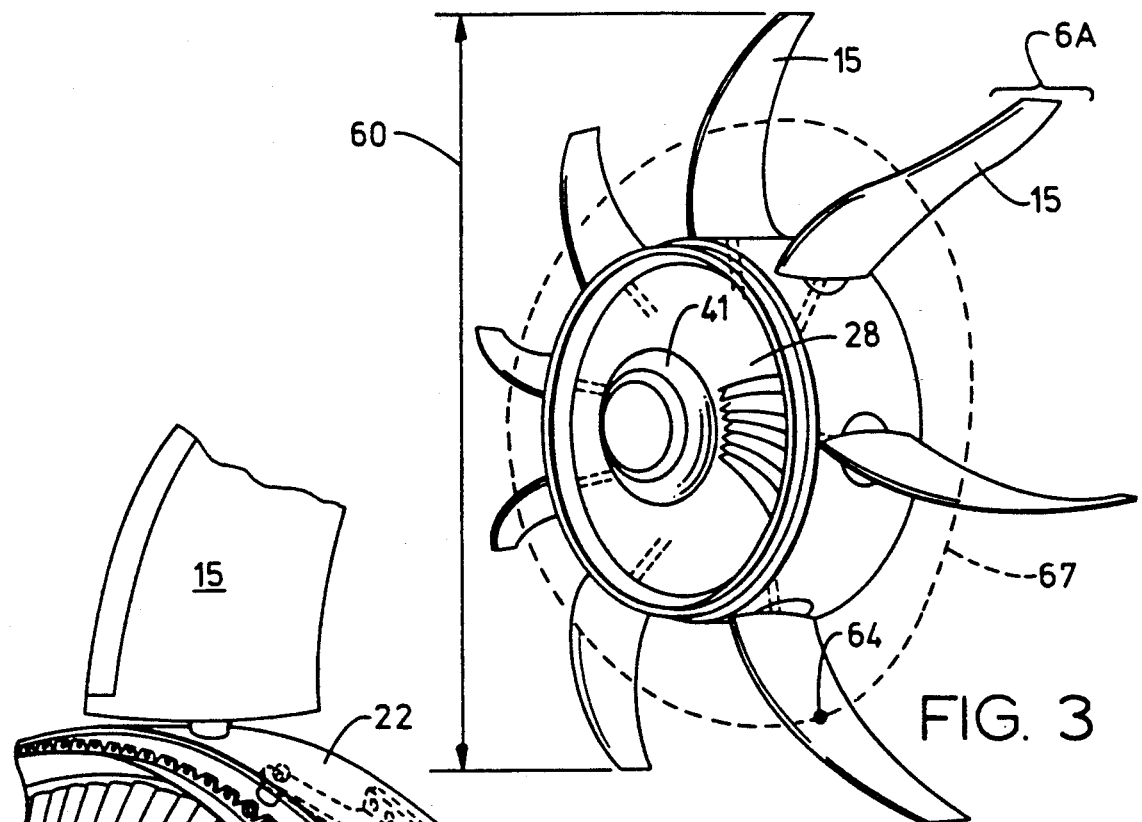
FIG. 3 is a schematic view of sub-region 6A in FIG. 2.
Figure 11:
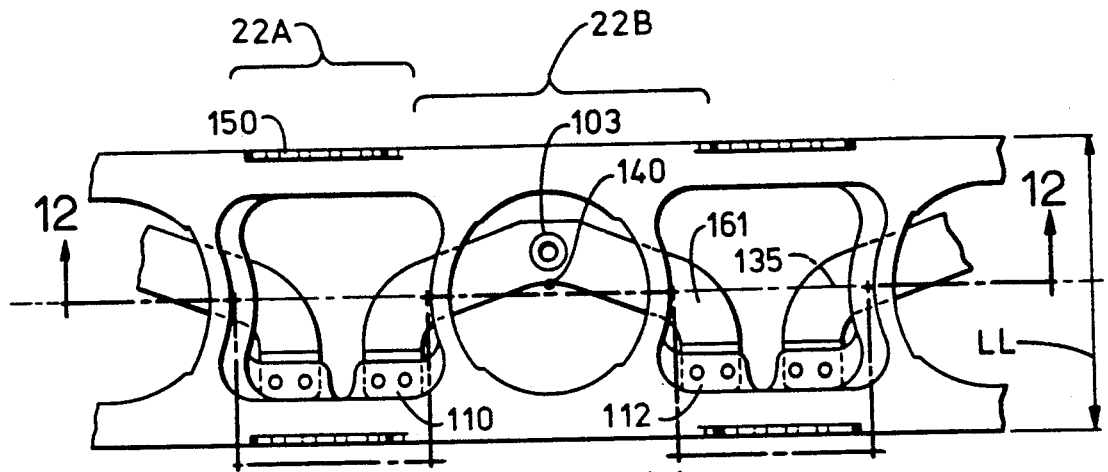
FIG. 11 is a radial view, taken along line 213 in FIG. 7, of one form of the invention.

Further, the brackets are positioned such that (1) the bracket-ring attachment and (2) the bracket-casing attachment points straddle the mid-line 135 of the casing in FIG. 11. That is, attachment point 103, which acts as a center of rotation as shown in FIG. 10, is on the opposite side of the mid-line 135 with respect to the attachment points 110 and 112, which attach the bracket to the ring. Restated, point 103 is in a different radial plane than are points 110 and 112. The mid-line 135, as shown in FIG. 11, intersects the pitch axis 140 of the blades 15 in FIG. 2. The pitch axis 140 is also shown in FIG. 2, and is the axis about which the propeller blades rotate during pitch change, as indicated by arrow 145.

Figure 5:
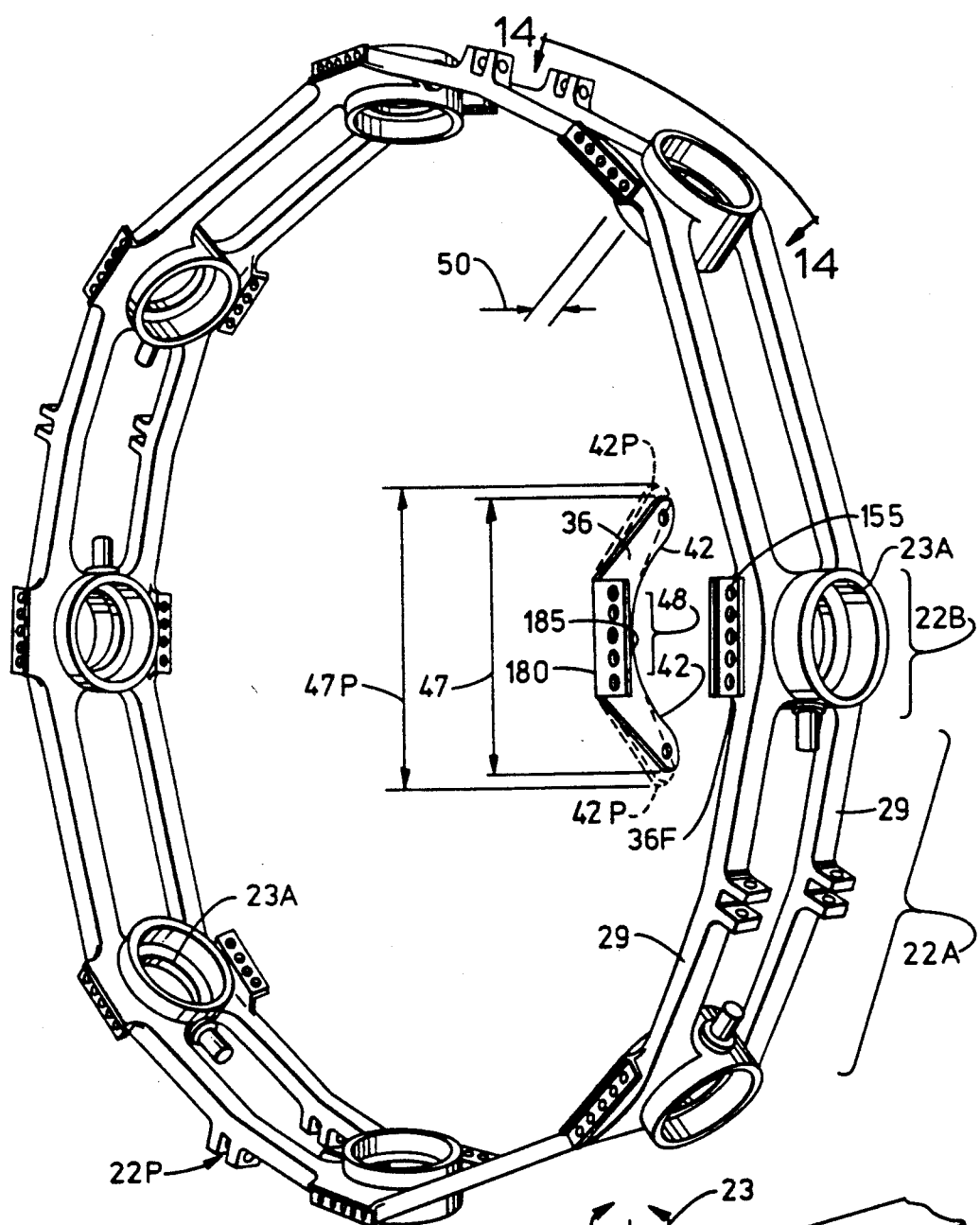
FIG. 5 illustrates a polygonal ring, which is the actual ring used to carry blades 15 in FIG. 4.
Figure 5A:
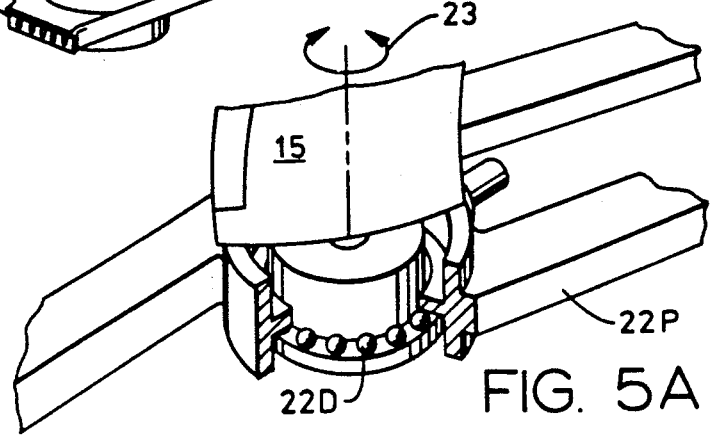
FIG. 5A illustrates a hub region 22B of FIG. 5.
Figure 6:
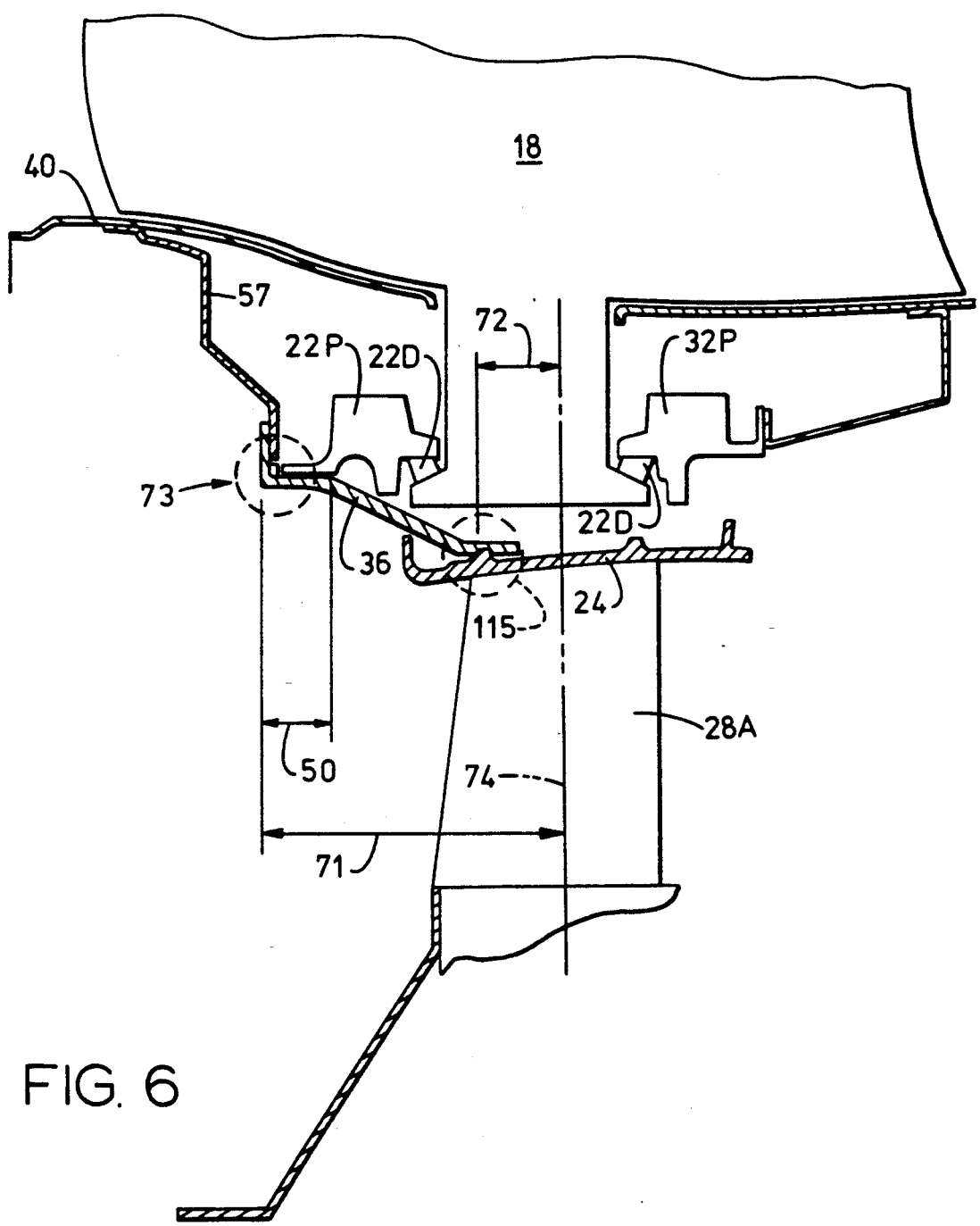
FIG. 6 illustrates in cross section a region such as 6C in FIG. 2.

In another aspect of the invention, the brackets 57 which mount the cowling 40 to the polygonal ring 22P are moved from their positions shown in FIGS. 4 and 5. In the prior art, the brackets 57 are located at the hub sections 22B, as indicated in FIGS. 5 and 6. In the present invention, the cowl brackets 155 in FIG. 7 are located on the connector sections 22A, and fastened to flanges 150 in FIGS. 7, 11, and 12.

Figure 12:
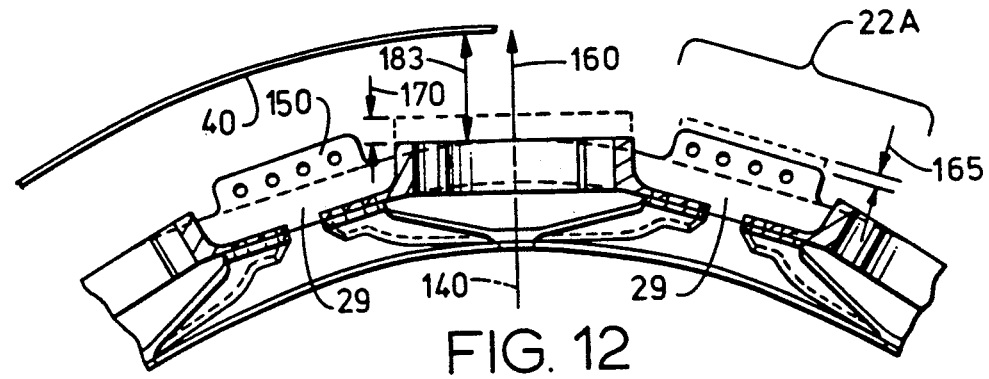
FIG. 12 is an axial view, taken along line 214 in FIG. 7, of one form of the invention.

This positioning of the brackets 155 reduces distortion of the cowling 40 for the following reason. As indicated in FIG. 12, the centrifugal load of the propeller blades causes the hubs sections to dislocate in the radially outward direction, in the direction of arrow 160. The hub sections deflect as indicated by dimension 170, while the connector sections deflect by a smaller amount 165. The reason that the connector sections deflect less is that the centrifugal load of the blades dislocates the hub sections 22B, and places the connector rails 29 into tension. Therefore, fastening the cowling brackets 155 to the rails 29 of the connector sections 22A eliminates the cowl distortion which would occur if the brackets were instead attached to the hub sections 22B. With the present invention, the hub sections 22B still move radially outward, as indicated by dimension 170 in FIG. 12, but such motion merely decreases slightly the clearance 183 between the ring and the cowling 40.

An important feature of the invention is that the brackets 101 in FIG. 7 bend into phantom positions 101A when thermal growth of the casing 24 occurs relative to the ring 22P. However, the arms 120 and 121 of the brackets do not separate, or splay, as do arms 42 of the prior art bracket 36 in FIGS. 4 and 5.

Such splaying of the arms can cause stress, or even damage, to occur in the web 48 of the bracket 36 in FIG. 5. For example, deformation of the arms to phantom positions 42P causes region 180 of the bracket to be in compression, and region 185 to be in tension. Repeated cycling of this deformation can cause work-hardening and embrittlement of the material in region 48 to occur, which is undesirable.

Thus, it may be said that no substantial deformation of the brackets occurs during thermal growth: splaying is absent, and the brackets merely bend between phantom positions 120A and 120B in FIG. 10 during thermal cycling. Such bending is not nearly so damaging as is splaying. In splaying, separation 47 in FIG. 5 changes to dimension 47P. However, the legs 42 bend hardly at all: all the deformation occurs within web 48. That is, all of the deformation is localized within the web 48, which has a length 47C in FIG. 4.

In contrast, with the present invention, splaying is eliminated, and only bending occurs. Further, the bending is distributed over the entire length 47D in FIG. 10 of the bracket 120. Since length 47D is significantly greater than the web length 47C (shown approximate), the deformation is distributed over a larger piece of material and so the per unit bending is reduced.

Restated, the present invention eliminates the splaying of the legs 42 in FIG. 5, and thus reduces, or eliminates, the stress occurring in the web 48. The elimination of the stress eliminates stress-induced buckling in region 115 in FIG. 7.

The invention has been described in the context of counterrotating fan blade pairs. However, the invention can be used with a single (ie, unpaired) fan blade array.

Numerous substitutions and modifications can be undertaken without departing from the true spirit and scope of the invention as defined in the following claims. For example, the previous discussion has been made in the context of fan blades carried by a ring which surrounds a rotor in the form of a turbine. However, the rotor need not be a turbine, but can be a gear transmission which carries power from a high-speed turbine to the ring.

What is desired to be secured by Letters Patent is the invention defined as follows:

1. An aircraft propulsion system comprising:
   (a) a ring which carries a plurality of propeller blades and which surrounds a rotor; and
   (b) a plurality of V-shaped brackets connecting between the ring and the rotor which bend without substantial splaying in response to thermal growth of the rotor with respect to the ring.

2. An aircraft propulsion system comprising:
   (a) a turbine casing which
      (i) supports a ring which carries propeller blades, and
      (ii) experiences thermal expansion; and
   (b) a plurality of connectors for transmitting thrust load and torque load between the ring and the casing, in which the thermal expansion causes bending of the connectors, and no other significant deformation wherein said connectors comprise opposed links coupled to said ring.

3. An aircraft propulsion system comprising:
   (a) a turbine casing which
      (i) supports a ring which carries propeller blades, and (ii) experiences thermal expansion; and
(b) a plurality of brackets, each including at least two divergent links for attaching to two or more respective locations on the ring and at a single respective location on the casing.

4. Apparatus according to claim 3 in which the locations on the ring are not in the same radial plane as the locations on the casing.

5. Apparatus according to claim 3 in which the locations on the ring and the locations on the casing lie on opposite sides of pitch axes of propeller blades.

6. In an aircraft propulsion system in which a turbine casing supports a ring which carries propeller blades, and in which the turbine casing experiences thermal expansion, the improvement comprising:
(a) a turbine casing which
    (i) supports a ring which carries propeller blades, and
    (ii) experiences thermal expansion; and
(b) a plurality of groups of anchors, each group comprising first and second anchors on the ring and consisting of a single third anchor on the casing; and
(c) means for connecting the first, second, and third anchors to each other.

7. An aircraft propulsion system, comprising:
(a) a turbine having a casing which undergoes thermal expansion;
(b) a ring surrounding the turbine which undergoes less thermal expansion than the turbine;
(c) a plurality of propeller blades extending from the ring; and
(d) a plurality of brackets each comprising a pair of divergent legs for transferring torque load and thrust load between the ring and the casing, the shapes of which remain substantially constant in response to the thermal expansion.

8. An aircraft propulsion system, comprising:
(a) a turbine which undergoes thermal expansion;
(b) a ring surrounding the turbine;
(c) a plurality of propeller blades extending from the ring; and
(d) a plurality of coupling means, for connecting the ring to the turbine, which bend in response to the relative thermal growth and which undergo no other significant deformation in response to the thermal growth said coupling means comprising articulated members coupled to said ring.

9. An aircraft propulsion system comprising:
(a) a ring which surrounds a turbine casing and carries a plurality of propeller blades; and
(b) a plurality of generally V-shaped brackets, each of which has legs and an apex, and in each of which the legs connect to the ring and the apex connects to the turbine casing.

10. An aircraft propulsion system comprising:
(a) a rotatable turbine;
(b) a ring surrounding the turbine casing;
(c) a plurality of propeller blades supported by the ring; and
(d) a plurality of brackets extending between the ring and the turbine casing, each of which is (i) fastened to the turbine casing by a single fastener and (ii) fastened to the ring by two or more fasteners.

11. An aircraft propulsion system comprising:
(a) a turbine casing which supports a ring which carries propeller blades; and
(b) a plurality of brackets for connecting the ring to the casing, all of which are located entirely between the axial edges of the ring said brackets comprising converging members having first ends coupled to said ring and second ends coupled to said casing.

12. An aircraft propulsion system comprising:
(a) a turbine casing which supports a ring which carries propeller blades; and
(b) a plurality of brackets for connecting the ring to the casing, each of said brackets comprising opposed leg portions having first ends coupled to said ring and having all parts located radially inward of the ring.

13. An aircraft propulsion system comprising:
(a) a turbine which
    (i) includes a turbine casing which supports a ring which carries propeller blades, and
    (ii) comprises blades having radial axes defined therein; and
(b) a plurality of V-shaped brackets extending between the casing and the ring, and having attachment points on the casing which approximately coincide with a radial plane which contains the axes.

14. An aircraft propulsion system comprising:
(a) a turbine which
    (i) includes a turbine casing which supports a ring which carries propeller blades, and
    (ii) comprises blades having radial axes defined therein; and
(b) a plurality of V-shaped brackets extending between the casing and the ring and fastened to the casing such that the effective center of rotation of each bracket lies on the surface of the casing.

* * * * *